United States Patent [19]

Bichot et al.

[11] Patent Number: 4,913,764
[45] Date of Patent: Apr. 3, 1990

[54] DEVICE FOR MANUFACTURING SHELLS OF MINERAL FIBERS

[75] Inventors: Bernard Bichot, Clermont; Bernard Louis, Liancourt, both of France

[73] Assignee: Isover Saint-Gobain c/o Saint-Gobain Recherche, Courbevoie, France

[21] Appl. No.: 290,265

[22] Filed: Dec. 27, 1988

Related U.S. Application Data

[62] Division of Ser. No. 800,038, Nov. 20, 1985, Pat. No. 4,830,808.

[30] Foreign Application Priority Data

Jun. 14, 1985 [FR] France ................... 85 09059

[51] Int. Cl.⁴ ........................................... B32B 31/00
[52] U.S. Cl. .................. 156/446; 425/363; 425/367
[58] Field of Search ............... 156/443, 446, 184–188, 156/189–192, 215, 218; 242/66, 67.1, 55.1; 264/257, 258; 425/367, 363

[56] References Cited

U.S. PATENT DOCUMENTS

| | | | |
|---|---|---|---|
| 3,052,073 | 9/1962 | Johansen et al. | 242/55 X |
| 3,140,968 | 7/1964 | Barrios et al. | 156/192 |
| 3,344,009 | 9/1967 | Levecque | 156/446 |
| 3,723,245 | 3/1973 | Blary | 162/284 |
| 4,153,498 | 5/1979 | Bichot et al. | 156/446 |
| 4,164,177 | 8/1979 | Canfield | 100/40 |

FOREIGN PATENT DOCUMENTS

| | | |
|---|---|---|
| 596181 | 4/1934 | Fed. Rep. of Germany . |
| 605793 | 11/1934 | Fed. Rep. of Germany . |
| 1062606 | 7/1959 | Fed. Rep. of Germany . |
| 1224072 | 6/1960 | France . |
| 1345096 | 10/1961 | France . |
| 1461528 | 12/1966 | France . |
| 2278485 | 5/1974 | France . |
| 2548586 | 1/1985 | France . |
| 1534597 | 12/1978 | United Kingdom . |
| 2109349 | 6/1983 | United Kingdom . |

*Primary Examiner*—David Simmons
*Attorney, Agent, or Firm*—Oblon, Spivak, McClelland, Maier & Neustadt

[57] ABSTRACT

In the manufacture of insulating shells formed by a felt of mineral fibers wound around a mandrel, main pressing elements intervene as soon as the winding begins and remain in contact with the surface of the shell during the entire winding phase. Auxiliary pressing elements intervene only when the shell, during shaping, has reached a given outside diameter of, for example, 200 mm. The invention applies particularly to the insulation of conduits of small and average outside diameters.

5 Claims, 5 Drawing Sheets

DEVICE FOR MANUFACTURING SHELLS OF MINERAL FIBERS

This is a division of Ser. No. 800,038, filed Nov. 20, 1985, now U.S. Pat. No. 4,830,808.

BACKGROUND OF THE INVENTION

1. Field of the Invention

The invention relates to the manufacture of tubular fibrous products or shells, intended particularly for the heat insulation of conduits and made of mineral fibers, for example of glass, agglomerated by a polymerized binder. The invention relates more particularly to techniques for winding of felts of mineral fibers around a mandrel of a predetermined length to produce cylindrical shells.

2. Discussion of the Art

According to these techniques, a felt of mineral fibers impregnated with a binder consisting of a polymerizable resin, for example of the melanin formaldehyde, phenylformaldehyde or phenol-urea type, is cut into sections of a predetermined length. Each section of felt is wound around a revolving mandrel while the polymerization of the binder begins, which is then completed in a heated chamber.

This process is particularly known from U.S. Pat. No. 4,153,498 to which special reference is made. In this process the revolving mandrel, around which the felt of mineral fibers is wound, is heated. This heating of the mandrel facilitates the anchoring of the first layer or wrap of felt. The temperature is selected so that an inner surface of the shell hardened by the polymerization of the binder in the vicinity of the mandrel is formed during the winding time. Thus, as soon as the winding ends, the shell can be separated from its mandrel and can be transferred to a device which assures the smoothing and hardening of the outside surface of the shell. At this stage, it exhibits hardened inner and outer surfaces while apart from these inner and outer surfaces, the polymerization of the binder remains incomplete. Polymerization is then completed homogeneously through the entire thickness of the shell in a heated chamber.

Also according to French Pat. No. 4,153,498, the winding of the felt around the revolving mandrel is performed while maintaining the speed of the mandrel, leading to an accelerated tangential speed. Because of this, the thickness of the shell being formed increases with a constant speed.

This process is perfectly suited for the production of shells of small inside and outside diameters, for which only small lengths of felt of mineral fibers need be wound, for example less than 6 meters. Feeding the winding device should be performed at an accelerated speed, however it is impossible to increase the speed for feeding felt of mineral fibers too much without risking a tearing of the felt which is made more fragile by the fact that the mineral fibers are not yet bound to one another. The maximum feeding speed reached at the end of winding is a function of the outside diameter of the shell and of the rotation speed of the mandrel, and should be less than the speed beyond which the felt might be torn. This calls for a maximum rotation speed of the mandrel, to be inversely proportional to the outside diameter of the shaped shell at the end of winding. This limitation becomes particularly constraining for shells of large outside diameter. Thus, by way of example, if a feeding speed limited to 50 meters per minute is assumed, for a shell with an outside diameter of 400 mm, the mandrel should have a constant rotation speed less than 40 revolutions per minute. With layers of an average thickness of about 0.3 mm, a winding time for a shell of 100 mm total thickness is greater than 8 minutes. The rate of production according to this example would therefore be very low.

According to another important characteristic of U.S. Pat. No. 4,153,498, during the entire time of winding, pressing elements remain in contact with the shell being formed. These pressing elements consist, for example, of three counterrollers placed around the heated revolving mandrel. Simultaneously withdrawing from the axis of the mandrel as the shell is formed, these counterrollers assure, on the one hand, the uniformity of the winding and, on the other hand, the cohesion of the shell. Actually, these counterrollers define uniform lines of contact with the shell being formed, which define the general shape of the shell during the winding time. In addition, by the way their pressure is exerted, the counterrollers avoid any non-uniformity of the layers of wound felt.

In practice, three counterrollers are satisfactory for "small" shells, i.e., shells whose inside diameter is between 12 and 100 mm and whose outside diameter is less than 200 mm. When these limiting values are exceeded, for example for shells whose outside diameter reaches 500 mm, three contact points prove insufficient to define the shape of the shell correctly and the counterrollers no longer assure the desired cohesion. Since the squeezing of the shell is maintained by the counterrollers, the pressure exerted is all the greater if a large portion of the outside surface of the shell is in contact with the counterrollers; in other words, if the surface of each counterroller in contact with the shell is increased. However, this contact surface is limited by the fact that the diameter of the counterrollers cannot exceed such a value that the counterrollers are both tangential to one another and to the heated revolving mandrel which determines the value of the inside diameter of the shell. Of course, it would be possible to increase the number of counterrollers, but their diameter would then have to be reduced for the same reasons of bulk. Because of this, an installation well-suited to the production of shells of small inside diameter would provide shells of average inside diameter and/or of average thickness of poor quality while, reciprocally an installation well suited to the production of shells of average inside diameter would not be able to produce shells of small inside diameter, because no pressure would then be exerted on the first wound layers.

The use of this process of the art for the production of shells of average thickness also runs into an additional difficulty connected with the compressibility of the product. Actually, according to this process, the counterrollers are gradually withdrawn from the axis of the revolving mandrel so that during the entire winding phase, a constant force is exerted on the felt of mineral fibers by the counterrollers. Consequently, the first layers or wraps wound, whose outer surface remains not far from the completely rigid surface of the revolving mandrel, are more compressed than the last wraps which are separated from the rigid mandrel by considerable thickness of compressible felt. Because of the partial elasticity of the felt of mineral fibers, and because of this difference in compression, the pickup of thickness of the shell is greater at the end of winding; the result is a shaped shell whose outside diameter is imperfectly controlled and greater than the expected theoretical diameter.

SUMMARY OF THE INVENTION

This invention has as its object to improve the prior techniques for producing shells by winding a felt of mineral fibers impregnated with a binder around a revolving mandrel. In particular, the invention has as its object a process and an installation for manufacturing insulating shells whose inside diameter and thickness can vary within relatively wide limits.

According to the invention, there are continuously manufactured insulating shells made of mineral fibers agglomerated by a binder while winding a felt, impregnated with a binder in the nonpolymerized state, around a heated revolving mandrel whose temperature is such that an inner hardened surface is formed on contact during winding and while exerting a certain pressure on the shell being formed, on the one hand, by pressing elements consisting of main counterrollers which remain in contact with the outer surface of the shell during the entire winding phase and, on the other hand, by auxiliary pressing elements which come in contact with the shell only when the outside diameter of the shell reaches a given value during shaping.

Depending on whether the diameter of the mandrel is or is not greater than this value in question, the auxiliary counterrollers do or do not intervene as soon as winding begins. The choice of the dimension for which the auxiliary counterrollers intervene is a function of the maximum values of the inner and outer dimensions of the shells able to be shaped with the winding device. In any case, this choice is always the result of a compromise, the maximum effectiveness of the counterrollers being obtained at the beginning of their intervention.

For example, to produce insulating shells whose inside diameter, depending on needs, can vary between 12 and 400 mm and whose outside diameter reaches up to 500 mm, three main counterrollers are advantageously used which alone intervene as long as the outside diameter of the shell remains, for example, less than 200 mm, and three auxiliary counterrollers which additionally intervene as soon as the outside diameter of the shell reaches this 200 mm value, either because of the wound felt thickness or simply because the selected revolving mandrel itself has a diameter greater than or equal to 200 mm. The auxiliary counterrollers are placed in contact with the felt and controlled so that they withdraw from the axis of the heated revolving mandrel with the same instantaneous speed as that of the main counterrollers, thus exerting an identical pressure on the wound felt.

Preferably, according to the invention, the pressure exerted by the main, and possibly auxiliary, counterrollers is increased as the winding progresses by reducing the withdrawal speed, which makes it possible to obtain an approximately identical compression for all the wound felt wraps.

According to a preferred characteristic of the invention, the reduction of the withdrawal speed of the counterrollers is performed with a constant deceleration; the withdrawal speed at the end of winding being selected equal to the speed of increase of the diameter of a perfect shell, this theoretical speed being calculated for a diameter value equal to the outside diameter of the shaped shell obtained by the winding of a strip of incompressible material.

Also preferably, the felt of mineral fibers is wound at an approximately constant tangential speed which implies that the rotation speed of the mandrel, at any time, is a function of the outside diameter of the shell being formed. According to a particularly simple embodiment the rotation speed of the mandrel is reduced in a linear manner, the rotation speeds at the beginning and end of winding calculated on the assumption of a winding at constant tangential speed being taken as a reference.

It should be noted that a linear reduction of the speed of the revolving mandrel has the effect of bringing about a slight stretching of the wound felt which is thus compressed around the mandrel. This leads to a greater density for the shaped shell. On the one hand, this increase in the density of the product reduces the bulk of the product which facilitates its being placed around conduits; on the other hand, the shells made of glass fibers for thermal insulation generally have a density close to 60 kg/m$^3$. The coefficient of thermal conductivity can be expressed as a function of the density of the product in the following manner $\lambda = A + B \cdot \rho + C/\rho$, where A, B and C are variables that essentially depend on the temperature and the nature of the product. In the case of glass fibers, the thermal conductivity remains minimum for a density around 60-90 kg/m$^3$. Therefore, a slight variation of the density here does not have a serious effect on the coefficient of thermal conductivity, i.e., on the insulating capability of the shaped shell.

The invention also has as its object a device for winding a felt of mineral fibers around a heated revolving mandrel that can produce shells whose inside and outside diameters can vary within wide limits while exhibiting a good uniformity of shape. Thus, according to an embodiment of the invention, the inside diameter varies between 12 and 400 mm, while the outside diameter remains less than 500 mm.

The device according to the invention essentially comprises a frame which, on the one hand, supports a revolving mandrel made of two half-mandrels driven together in rotation and equipped with electrical resistors that provide heating and, on the other hand, main counterrollers and auxiliary counterrollers each equipped with a device for driving the same in rotation and with a device that assures moving these counterrollers away or closer in relation to the axis of the revolving mandrel. In addition, a device makes it possible to retract the auxiliary counterrollers.

The winding device according to the invention makes possible automation and requires only a minimum of operations for the exchange from one given type of shells for another.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
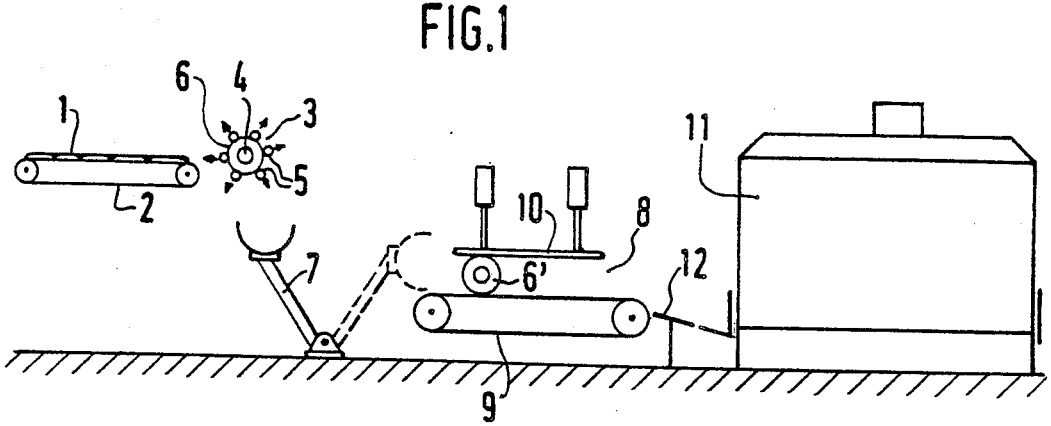
FIG. 1 is a schematic view of a device for manufacturing insulating shells comprising a winding device according to the invention.

In FIG. 1 are represented the main elements constituting a device for forming insulating shells made of mineral fibers, particularly of glass, held by a binder. Each shell is formed from a section 1 of felt of mineral fibers, particularly of glass, in which a binder is dispersed in the nonpolymerized state. The section is obtained, for example, by a tearing of the felt caused by a sudden pull on it. Section 1 is brought by a feeding conveyor 2 to a winding device 3. To avoid any deterioration of the still very fragile felt, since the fibers are not fixed to one another by the polymerized binder, feeding conveyor 2 preferably has a polyvinyl chloride belt. In addition, according to a preferred embodiment of the invention, the feeding speed is selected to be constant; in this way any slipping of the sections against the conveyor which can cause losses of fibers are avoided. Moreover, this feeding speed can be selected relatively close to the production speed of the felt of mineral fibers.

Winding device 3 has a revolving mandrel 4 and counterrollers 5 which withdraw from the axis of the mandrel as felt 1 is wound. These counterrollers 5 exert a pressure on the shell being formed. Thus, they assure a good cohesion of the shell while inhibiting the formation of folds.

The revolving mandrel is heated to such a temperature that the inner surface of the shell is hardened by the polymerization of the binder in the vicinity of the mandrel. By way of example, for ordinary binders with a base of formaldehydephenolic resins, the mandrel may be heated to a constant temperature in the order of 350°–400° C., regardless of the thickness of the shaped shell. This makes it possible to obtain a polymerized thickness which is larger with a greater thickness of the shaped shell. Thus, independently of its size, the shell exhibits a certain rigidity which facilitates its ejection from the mandrel. As soon as the winding ends, shaped shell 6 is separated from mandrel 4 and transferred by device 7 with pivoting arms to smoothing device 8 which makes possible the formation of a "skin" on the outside surface of shell 6'. Smoothing device 8 comprises a hinged conveyor 9 and a smoothing plate 10 that can be raised or lowered to suit various outer diameters of shells, and is equipped with electrical resistors. Its temperature is regulated at about 400° C., for the type of binders considered by way of example.

Shell 6' is driven in rotation by contact with an upper portion of its generatrix on smooth plate 10 and with a lower portion of its generatrix on conveyor 9. In addition to the formation of a "skin", this smoothing device 8 also allows a possible surface treatment of the shaped shell.

After smoothing, the shell which has inner and outer hardened surfaces, while the binder has not yet completely polymerized between these peripheral surfaces, is brought to a polymerization oven 11 via a receiving table 12. For details of this polymerization oven, reference is made to French Pat. No. 2,325,007 and 2,548,586, the latter describing a microwave oven whose use is preferred here.

The polymerized shells are then brought to a cooling device, then placed lengthwise and finally cut lengthwise to make it possible to position them around conduits.

Figure 2:
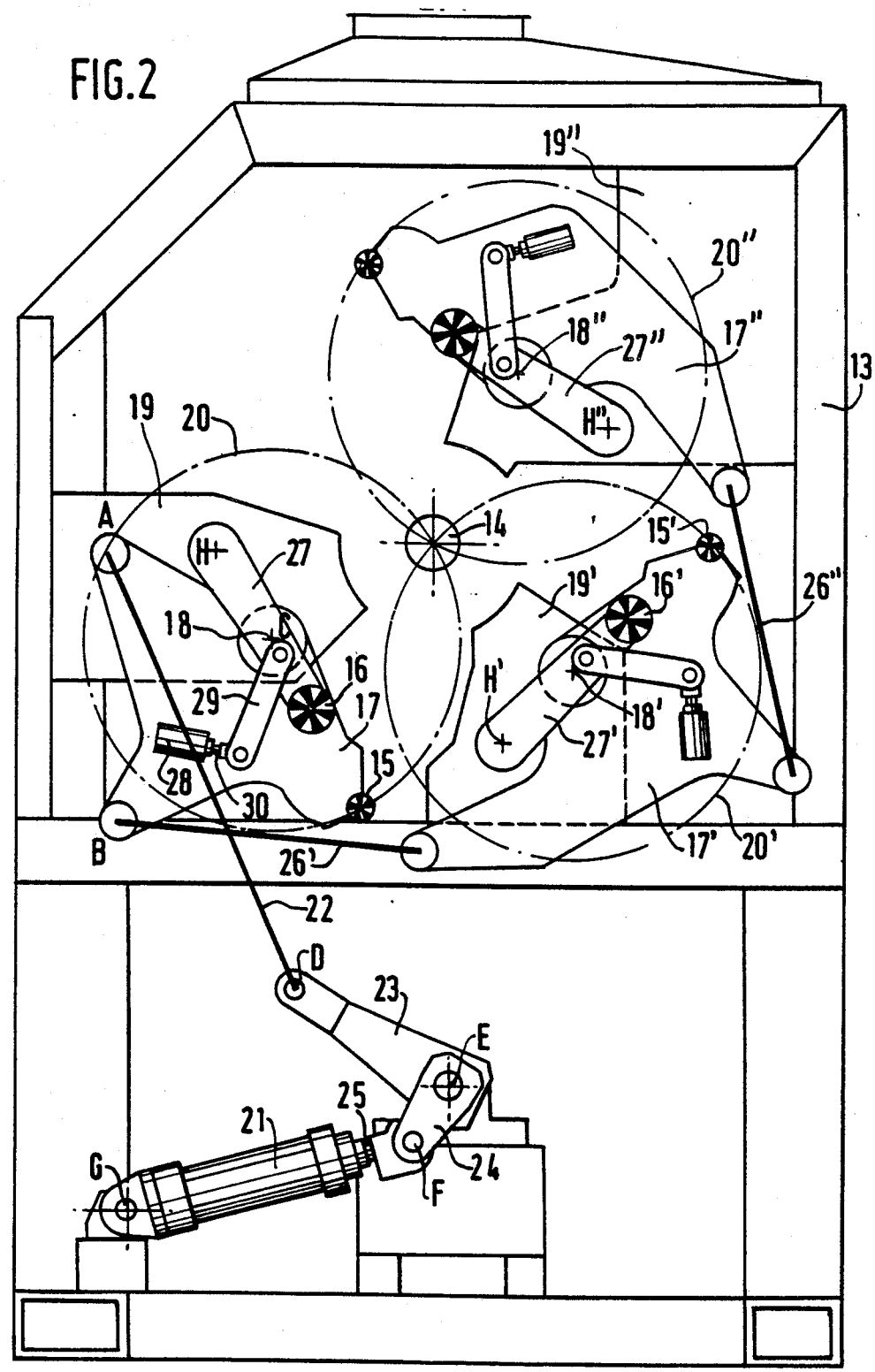
FIG. 2 is a schematic view of a winding device according to the invention in ejection position.

FIG. 2 shows, in greater detail, an embodiment of a winding device according to the invention. It includes a mechanically welded frame 13 which supports the various parts of the winder and their movement device.

Revolving mandrel 14 is composed of two axially spaced cylindrical half-mandrels, not separately shown, made for example of stainless steel, rotated together by a motor, preferably a direct current motor, or each independently driven in rotation, the two motors then being connected by a device for synchronization in relation to one another.

These two half-mandrels can be separated from one another to permit the ejection of a shaped shell. To do this, they are each equipped with a device for driving the same in translation along its axis, this device consisting of a hydraulic jack which controls the movement of the support of a half-mandrel and its motor.

Heating of the mandrel is provided by a bundle of electrical resistors distributed inside the mandrel and spaced as a function of its diameter.

While the felt is wound around the mandrel, counterrollers 15, 15', 15", 16, 16' and 16", exert a slight pressure on the outer surface of the shell. As FIGS. 2 and 3 in particular show, rotationally driven counterroller 15 is mounted on an axis fixed on a support plate 17, itself hinged for rotation around axis 18 which is connected to a stationary plate 19. Counterroller 15 can therefore describe the path of circle 20 passing through the axis of symmetry of the mandrel. This movement of support plate 17 is controlled by a rotary hydraulic jack 21. To do this, a point A of plate 17 is connected by a connecting rod 22 to an end D of a shaft 23 rotatable around fixed axis E. This rotation of shaft 23 is itself transmitted by shaft 24, rotatable around axis E and fixed to shaft 23 End F of shaft 24 is moved by the forward or backward movement of hinged jack 21, rotatable around fixed axis G, so that a movement of rod 25 brings about a movement of counterroller 15. The length of rod 25 is such that at the end of its travel, counterroller 15, placed at C, is in contact with the smallest mandrel that can be used. In practice, the mandrels used do not have a diameter less than 12 mm.

For greater clarity, so far we have mentioned only the case of the first counterroller 15. Counterrollers 15' and 15" are mounted in the same way on a support plates 17' and 17", hinged around axes 18' and 18" which are supported by frames 19' and 19". Plates 17' and 17" are controlled to move together with plate 17 by hinged arms 26' and 26'.

Figure 3:
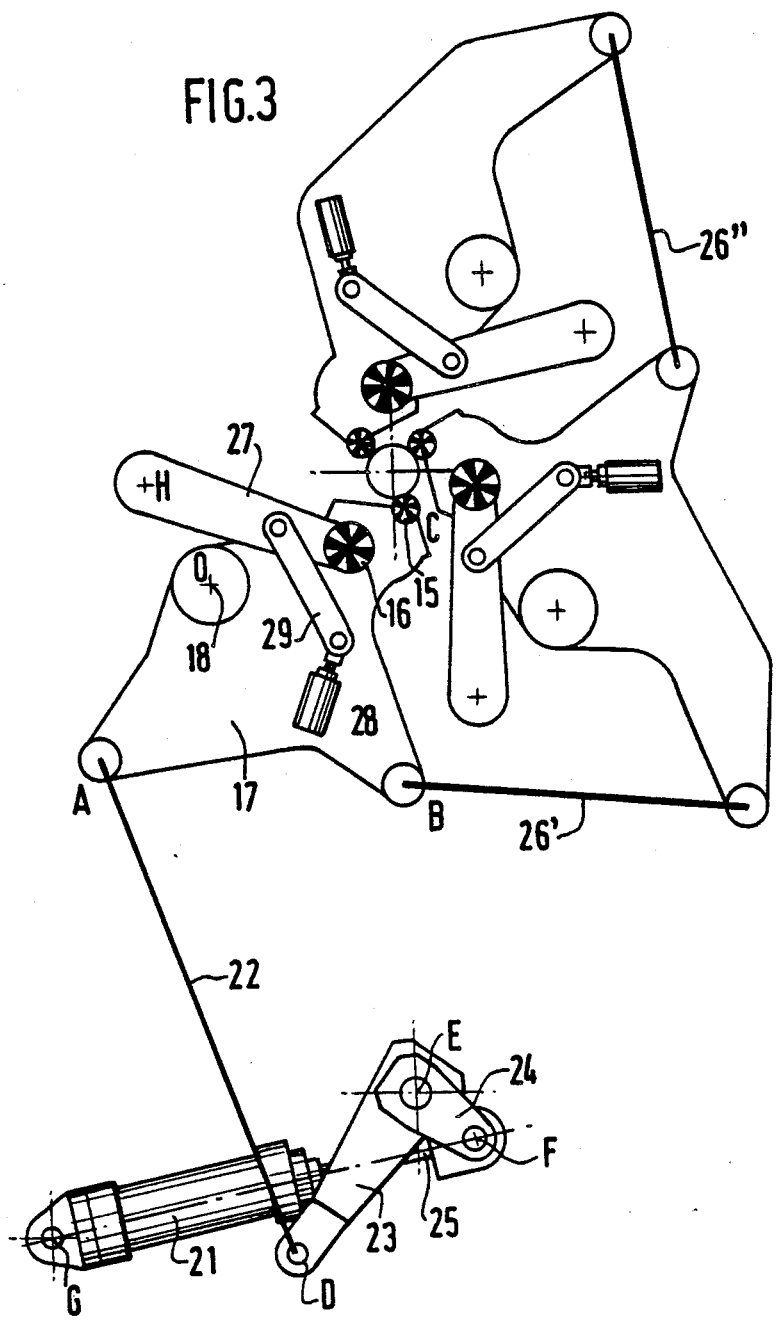
FIG. 3 is a schematic view of the winding device of FIG. 2 with the main counterrollers used while the auxiliary counterrollers are in a retracted position.
Figure 4:
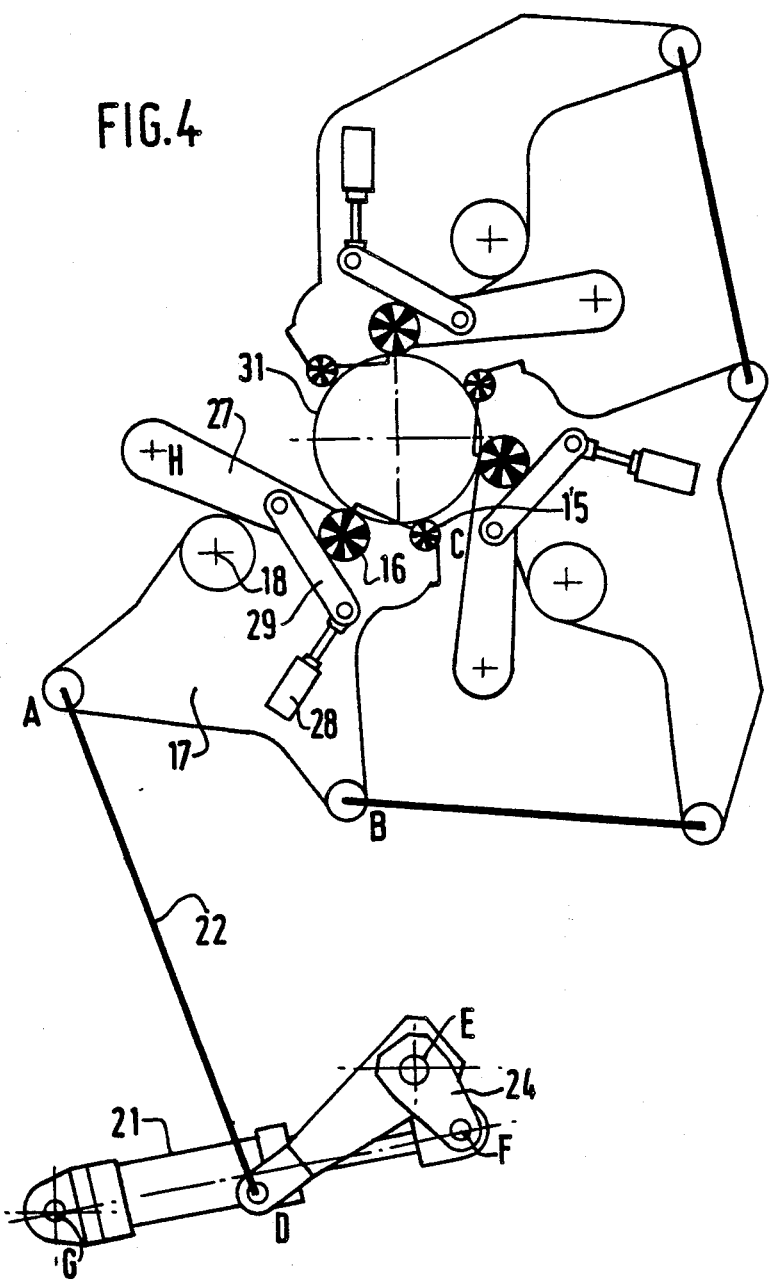
FIG. 4 is a schematic view of the winding device of FIG. 2 with the main and auxiliary counterrollers used.

In FIGS. 2, 3 and 4, each auxiliary counterroller 16, 16' and 16" is rotatably mounted and driven on an arm 27, 27' and 27" rotatable about a stationary axis H connected to one of the plates 19, 19' or 19". The rotation of each arm about axis H is controlled by a hydraulic jack 28, 28' or 28" mounted to support plate 17, 17' or 17" and which, through its arm 29, transmits to arm 27 the rotation movement of support plate 17, 17' or 17". It should be noted that hydraulic jack 28 must be sized and positioned such that when its piston rod is deployed, the generatrix of the auxiliary counterrollers 16, 16′ or 16″ closest to the axis of the mandrel is located on a cylinder 31 that also is tangent to the generatrices of primary counterrollers 15, 15′ or 15″, this cylinder 31 representing the outside envelope of the shell being formed, and shown more particularly in FIG. 4.

At the end of the counterrollers are placed flanges (not shown), mounted on a pivot and fixed to the rotary movements of support plates 17, 17′ and 17″. These flanges carry jacks identical with jacks 28, 28′ and 28″ and work in perfect synchronization with them, which makes it possible to retract auxiliary counterrollers 16, 16′ and 16″. These flanges also support hydraulic motors that drive the counterrollers in rotation.

The operation of the winder according to the invention is as follows. Initially, the main counterrollers 15 are brought together so that the central space left free between them is just enough to allow the passage of the two half-mandrels. The main counterrollers thus assure a guiding function for the half-mandrels, particularly important in the case of shell of small inside diameter, because a significant sagging effect otherwise occurs, since the half-mandrels are held only by one of their ends. It is noted that the diameter of the half-mandrels will preferably be 0.5 mm less than the inside diameter of the shaped shell. Thus, as soon as the first wrap of felt of mineral fibers is wound around the mandrel, counterrollers 15, 15′ and 15″ are in contact with the shell being formed. As the felt is wound, the outside diameter of the shell grows and counterrollers 15, 15′ and 15″ move away from the axis of the mandrel, their movement being controlled by the gradual backward movement of rod 25 of jack 21. When the outside diameter of the shell reaches, for example 200 mm, the auxiliary counterrollers —until then retracted —come into a work position, i.e., the piston rods of jacks 28, 28′ and 28″ are fully deployed (FIG. 4), which brings auxiliary counterrollers 16, 16′ and 16″ in contact with the shell. The movements of counterrollers 16, 16′ and 16″ are then controlled by those of support plates 17, 17′ and 17″ so that they exert a pressure identical with that of main counterrollers 15, 15′ and 15″.

Preferably, and as shown in FIGS. 2 to 4, auxiliary counterrollers 16, 16′ and 16″ have a diameter greater than that of the main counterrollers. Actually, to assure a compression distributed as well as possible over the outside surface of the shell, it is important to have a large contact surface. Now, it is clear that to be able to draw in the main counterrollers as soon as the winding phase begins, it is not possible to have main counterrollers with a diameter greater than $$\frac{\sqrt{3} \cdot d_m}{2 - \sqrt{3}},$$

where $d_m$ is the diameter of the mandrel.

In a multipurpose installation as preferably envisaged according to the invention, the counterrollers must be able to exert a sufficient compression for all types of shells to be shaped by the installation, including shells with an inside diameter on the order of 12 mm, which means that the main counterrollers cannot have a diameter greater than 77.6 mm. The maximum diameter of the auxiliary counterrollers is, of course, also limited by the diameter of the shell. However, the calculations show that if according to an embodiment of the invention, the auxiliary counterrollers are put in contact with the shell only when it reaches 200 mm in diameter, with main counterrollers of 77.6 mm in diameter, the theoretical maximum diameter of the auxiliary counterrollers is greater than 700 mm. For practical reasons, and although this theoretically does not correspond to the most favorable conditions for a good shaping of the shells, auxiliary counterrollers of much smaller dimensions are used, for example with a diameter equal to 80 mm.

Now we come to the difficulties posed by the winding itself around a heated revolving mandrel of a section of mineral fibers whose length can amount to about twenty meters, for the purpose of shaping an insulating shell with an outside diameter that can reach up to 500 mm.

As already mentioned, to operate such a winding according to an increasing feeding speed of a felt of mineral fibers with a heated mandrel revolving at a constant speed leads to very great winding times as soon as the outside diameter of the shaped shell exceeds 200 mm, for example. Also according to the invention, operating with a constant feeding speed of felt is selected, and therefore a speed of rotation of the mandrel decreases as the winding progresses.

Theoretically, this rotation speed of the heated mandrel should be equal at each time t to: $Vr = Va/\pi d$ where Vr is the rotation speed of the mandrel in revolutions per minute, Va the feeding speed of felt in meters per minute and d the outside diameter of the shell in meters at time t. If on the other hand, it is considered that overall, all the wound wraps of felt create an identical increase in the thickness of the shell, or in other words that all the wraps are compressed identically, the value of d is calculated in the following way:

$$d = \sqrt{\frac{t}{t_e}(d_e^2 - d_m^2) + d_m^2}$$

where $t_e$ is the time necessary for the total winding of a shell, $d_e$ the final outside diameter of the shaped shell and $d_m$ the diameter of the mandrel around which the felt is wound.

Figure 5A:
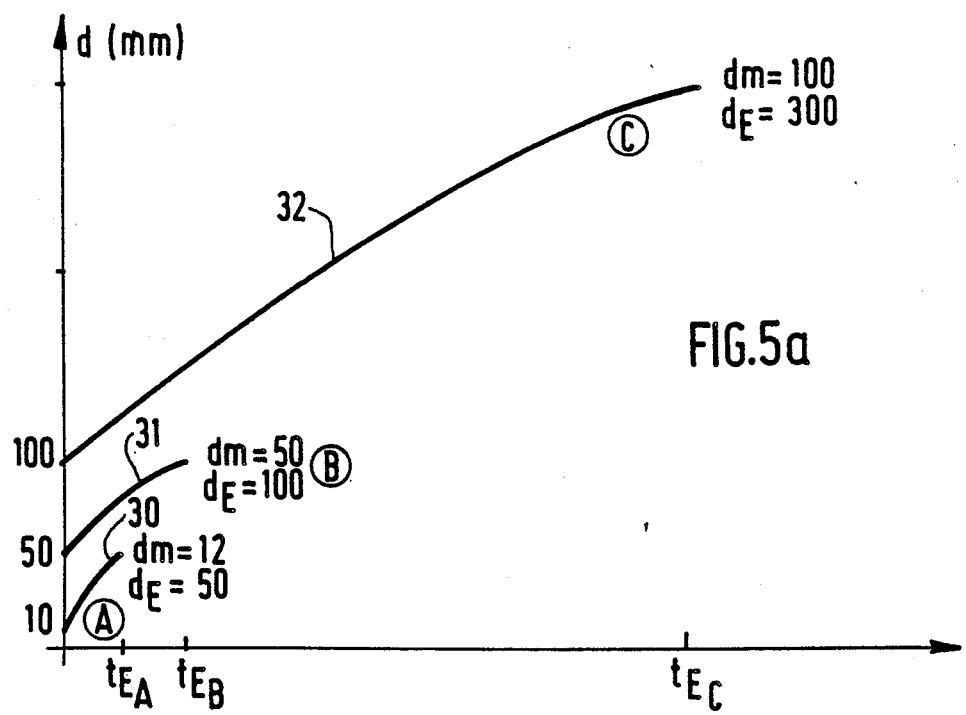
FIG. 5a is a graph of the variation, during winding, of the outside diameter of the shell, during formation, for 3 types A, B and C of insulating shells.
Figure 5B:
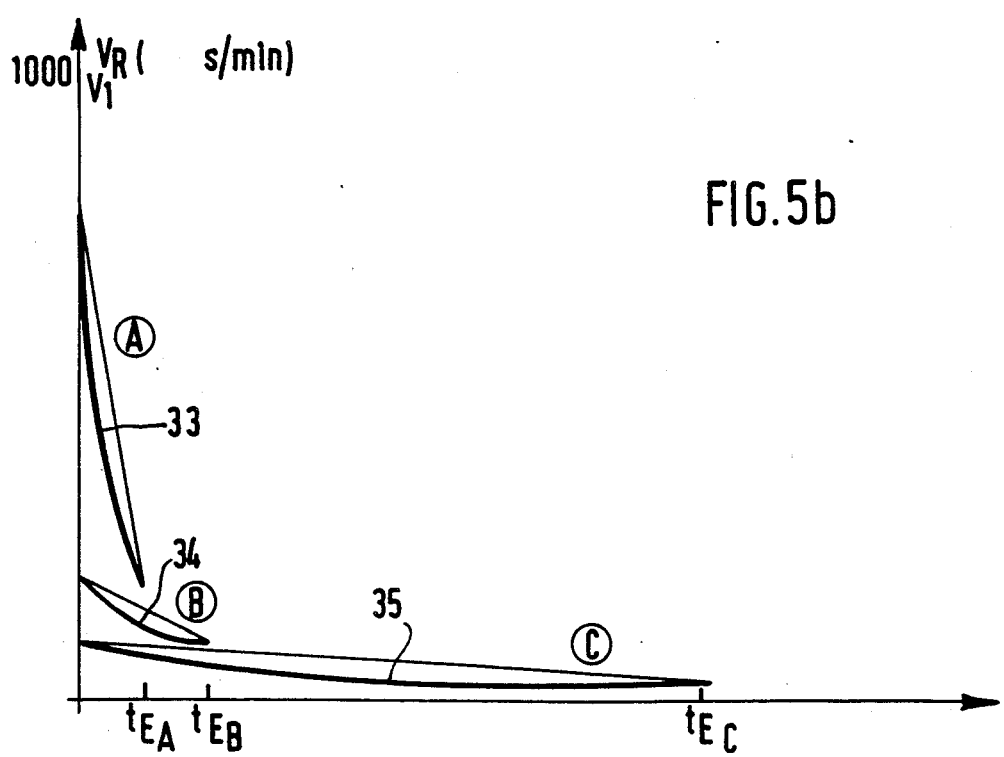
FIG. 5b is a graph of the variation, during winding, of the instantaneous speed curve of the heated revolving mandrel, corresponding to shells A, B and C.

FIG. 5 illustrates the variation, during the winding time, of the outside diameter of the shell (FIG. 5a) and of the corresponding rotation speed of the mandrel (FIG. 5b). Curve 30 corresponds, for example, to the winding, with a constant feeding speed Va =30 m.s³¹ ¹ for a time $te_A$ of a shell A with an inside diameter of $d_m$ =12 mm and with an outside diameter $d_e$ =50 mm. Curves 31 and 32 correspond respectively to the winding for a time $t_{eB}$ or $t_{eC}$ of a shell B or C, with $d_m$ =50 mm, $d_e$ =100 mm or $d_m$ =100 mm, $d_e$ =300 mm. It has been found in practice that for the thickness and outside diameter of the shells according to the invention, the representative curve of the diameter is practically a straight line.

From the instantaneous value of diameter d, it is deduced that the theoretical expression of the speed of the mandrel is equal to $$Vr = Va/\pi \cdot \sqrt{\frac{t}{t_e}(d_e^2 - d_m^2) + d_m^2}$$

Thus, for each type of shell, the only variable in this expression is time. At 33, 34, 35 the representative curve of this rotation speed of the mandrel $V_R$ has been represented as a function of time, respectively for shells A, B and C. First of all, it is found that the production of shells of small inside diameters requires that the mandrel be able to be driven up to a rotation speed close to 800 revolutions per minute. In the other hand, at the end of winding of a shell with an outside diameter of 500 mm, the rotation speed is less than 20 revolutions per minute for a feeding speed of felt kept constant at 30 meters per minute. Such variations of rotation speed make a perfect correlation between the rotation speed of the mandrel and the instantaneous theoretical speed.

According to the invention, care is taken that the real rotation speed of the mandrel be equal to the theoretical rotation speed $V_R$ previously calculated at the beginning and at the end of winding. Thus, on the one hand, at the beginning of winding a good anchoring of the first wraps on the mandrel is facilitated and, on the other hand, at the end of winding the formation of folds or unesthetic waves are avoided. Between these two reference values, the speed decreases linearly. This choice is made possible by the elasticity of the material which allows a certain stretching thereof. Moreover, aa already mentioned, the possible increase in the density of the shaped shell has virtually no effect on the conductivity for insulating shells made of glass fibers.

Concerning the counterrollers, we have already indicated that they are withdrawn from the axis of the mandrel as the diameter of the shell being formed increases, while exerting a slight pressure on the shell during the entire time of winding. The pressure exerted by the counterrollers should be such that the outside diameter of the shell conforms well to the desired diameter. To facilitate the anchoring of the first wraps, the counterrollers are preferably driven at a peripheral rotation speed equal to the feeding speed of felt of mineral fibers.

Since a felt of mineral fibers is a very compressible product, a certain pickup of thickness is observed at the end of winding. On the other hand, the more the thickness of wound felts increases, the more the shell being formed is soft and therefore the more it behaves like an elastic material. It is therefore all the more difficult to control the value of the outside diameter of the shell at the end of winding, if it exhibits a significant thickness of wound felt.

If the felts of mineral fibers behaved like a perfectly inelastic material, it would be easily calculated that at each time t, the withdrawal speed v of the counterrollers should be equal to $v = (d_e^2 - d_m^2) / (4 \cdot t_e d)$, where d, dc and dm represents the outside diameter of the shell respectively at time t, at the end of winding and at the beginning of winding and te the time necessary for the winding of the shell. Curve 36 represents this withdrawal speed v as a function of time for the shells of the type B and C previously described.

Figure 6:
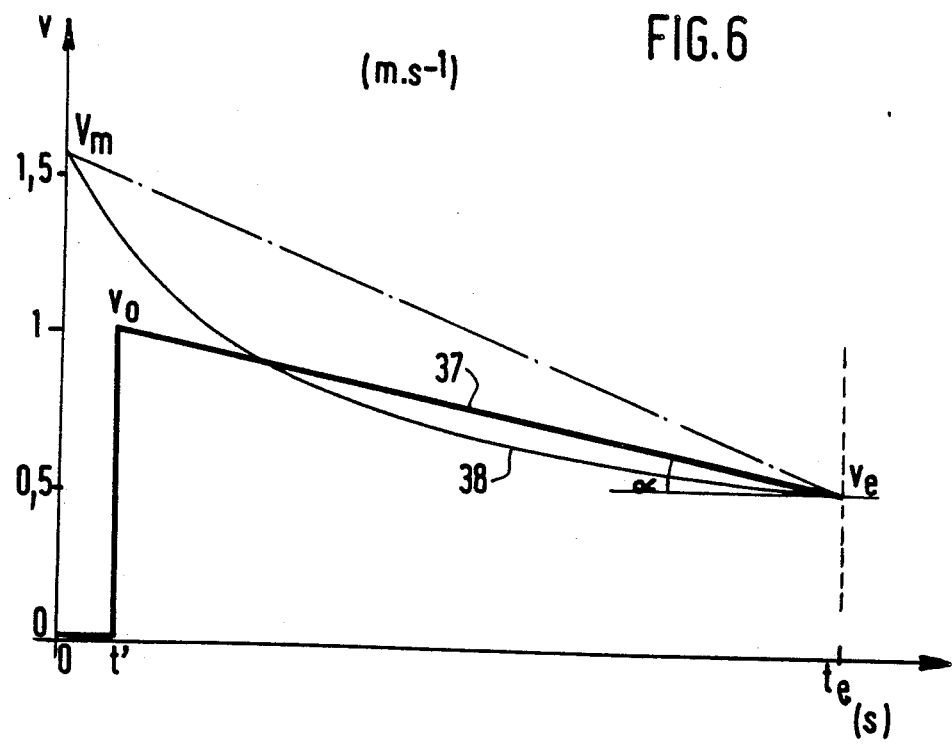
FIG. 6 is a graph of the variation, during winding, of the instantaneous withdrawal speed of the counterrollers, for shells A, B and C.

According to the invention, fixing the real withdrawal speed ve of the counterrollers at the end of winding is selected as being equal to speed v calculated at time $t_e$. Moreover, a linear variation of the withdrawal speed is necessary, slope x being obtained after linearization of the curve $v = f(t)$ or $\alpha = (d_e 31 d_m)/t_e 31 2V_e$. Curve 37 represents the straight line thus obtained It is found that, at the beginning of winding, the withdrawal speed of the counterrollers is less than the theoretical speed which makes it possible to exert an overcompression wich facilitates the formation of a hardened inner surface. It is also possible to increase this overcompression by varying the withdrawal of the counterrollers in relation to the beginning of the winding, as shown in FIG. 6, the counterrollers having a zero withdrawal speed from time $t=0$ to $t=t'$.

This measurement is especially important for shells of rather large thickness, on the order of 100 mm for example, because then the pickup of thickness of the shell becomes very significant as soon as the compression is stopped. To take this into account, it is proposed according to the invention to set a theoretical outside diameter less than the real diameter but which would be obtained after the same winding time. According to the invention, it has been found that in the case of shells of thickness less than 150 mm and of outside diameter not exceeding 500 mm very satisfactory results were obtained with a theoretical diameter equal to 88% of the outside diameter that is desired to be obtained after shaping. In this case, the necessary withdrawal speed of the counterrollers at the end of winding is equal to $$v' = \frac{(de \times 0.8)^2 - dm^2}{4 \, te \cdot de}$$

an the slope $\alpha'$ equal to:

$$\alpha' = (de \times 0.88 - dm) / te^2 31 \, 2v'.$$

Thus $v' < v$, which means a slight overcompression at the end of winding but also $\alpha' >$ means a compression smaller at the beginning of winding compensated for by the delay of the withdrawal of the counterrollers.

This servocontrol obtains an excellent result, i.e., a very good conformity between the measured value of the outside diameter of the shaped shell and the desired value, this of course for outside diameters according to the invention less than 500 mm, and of thicknesses less than 150 mm.

Of course, if shells of greater thicknesses must be shaped with a device of the type described in the invention which is however not preferred, it would then be necessary to select a smaller theoretical value of the outside diameter which will be determined after tests.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. An apparatus for manufacturing insulating shells made of mineral fibers, comprising:
    a frame;
    a mandrel rotatable about a first axis fixed to said frame;
    means for heating said mandrel;
    a plurality of main driven counterrollers rotatable about second axes parallel to said first axis;
    means for moving said second axes toward and away from said first axis, whereby said main counterrollers may press a shell wound on said mandrel;
    a plurality of auxiliary driven counterrollers rotatable about third axes parallel to said first axis, said second and third axes alternating with one another about the periphery of said mandrel,
    first means for moving said third axes toward and away from said first axis simultaneously with said movement of said second axes; and second means for moving said third axes toward and away from said first axis independent of said movement of said second axes, whereby said auxiliary counterrollers may press a shell wound on said mandrel independent of pressing by said main counterrollers.

2. The apparatus of claim 1 wherein said means for moving said second axes comprise:

a plate for each of said second axes, each said plate being pivotable on said frame about a fourth fixed axis parallel with said firs axis, a respective second axis being mounted on each said plate; and means for simultaneously pivoting said plates about said fourth axes.

3. The apparatus of claim 2 wherein said first means for moving said third axes comprise an arm for each of said third axes, each said arm supporting one of said third axes and being pivotally mounted on said frame about a fifth fixed axis parallel with said first axis , and wherein said second means for moving said third axes comprise means mounted on said plates for rotating said arms independently of said plates.

4. The apparatus of claim 1 including hydraulic means for rotating said main and auxiliary counterrollers about said second and third axes, respectively.

5. The apparatus of claim 1 wherein the auxiliary counterrollers have a diameter greater than that of the main counterrollers.

* * * * *